Patented Mar. 2, 1937

2,072,258

UNITED STATES PATENT OFFICE 2,072,258

METHOD OF PURIFYING GONADOTROPIC HORMONAL SUBSTANCES

Edwin L. Gustus, Kalamazoo, Mich., assignor to The Upjohn Company, Kalamazoo, Mich.

No Drawing. Application April 29, 1935,
Serial No. 18,917

5 Claims. (Cl. 167—74)

This invention relates to the method of producing gonadotropic hormonal substances that occur in the blood or uterine tissue of animals of the equine group during early pregnancy and has to do particularly with the preparation of such substances for parenteral injection. The present method is an improvement upon the method discussed in the "Journal of Experimental Medicine", vol. 58, No. 5, pp. 569–574, of Nov. 1, 1933, wherein Herbert M. Evans, Miriam E. Simpson and I discuss the production of this particular hormone under the title, "Concentration of the gonadotropic hormone in pregnant mare's serum."

In that article we disclosed a method of producing the hormonal substance from acetone dried serum from which most of the objectionable matter found in blood had been eliminated. I have since found that in preparing first the acetone dried plasma or serum and then from it the particular gonadotropic hormonal substance, much of the active ingredients may be lost, up to as high as 50%.

I have found that the particular gonadotropic hormonal substance can be made directly from blood serum or plasma without going through the steps of acetone drying of the plasma or serum, or may be made directly from extracts of the fresh or dried uterine tissue of the pregnant horn of a mare of the same status of pregnancy, if the condition of the blood serum or plasma or tissue extract is properly controlled as to acidity and dilution and if the adsorbing aluminum hydroxide is confined within the particular desired limits as to bound water content. If these conditions are properly controlled, the adsorption will take place directly in the blood serum, plasma or tissue extract and I have found that the various other substances present in blood serum or the like will not be adsorbed to any appreciable extent. In referring to tissue extracts, I refer to extracts prepared in accordance with the method set forth in my copending application on Method of producing hormonal substances, Ser. No. 18,915 filed April 29, 1935, or by any other suitable method.

It is well known that aluminum hydroxide will adsorb oxalates, tartrates and benzoates which are comparable to the citrate ordinarily present in substantially high concentration in citrated blood plasma, but I have found that by properly controlling the acidity and dilution of the serum, plasma or extract the aluminum hydroxide of the desired bound water content is substantially selective in adsorbing the hormonal substance. It is also well known that aluminum hydroxide will adsorb phosphates and carbonates which would be found in blood or the tissue extract, but I have found that by maintaining the desired conditions as above set forth I can make the aluminum hydroxide substantially selective so that the adsorption that occurs is practically that of the hormonal substance alone. In carrying out such an adsorption process it is well known that many unforeseen factors may have a very definite bearing on the result of the adsorption, either as to the elimination of the selectivity, or as to the complete or partial interference with adsorption. In this particular I have found that by controlling the conditions I can obtain substantially selective adsorption of the hormonal substances alone without any appreciable interference from the other substances present in blood, blood serum, plasma or in tissue extract.

In preparing solutions of the acetone dry protein material of pregnant mare's serum or plasma, many of the soluble salts occurring in the blood serum or plasma are eliminated in the acetone filtrate. These salts in the blood serum are, to a great extent, phosphates and bicarbonates, substances known to be adsorbable to aluminum hydroxide, which might interfere with the adsorption by the aluminum hydroxide of the hormonal substance under conditions other than those which I have set forth.

Heretofore in the process set forth in the paper above referred to by Evans, Simpson and myself, it had been noted that the elution of the hormonal substances from the aluminum hydroxide could be accomplished by using phosphates. In the paper referred to, the extraction of the hormone substances was for acetone dried serum or plasma from which most of the phosphates and other salts, and acetone and ether soluble blood constituents had been eliminated. I have found that by maintaining the conditions as herein set forth, interference from the substance does not occur in adsorbing directly from the serum, plasma or extract.

I have found that soluble sodium citrate used as an anti-coagulant in blood serum or plasma will not interfere with the adsorption if the conditions are maintained as herein indicated.

The fats which are ordinarily removed in preparing an acetone dried serum, but which are present in the fresh serum or plasma, also do not interfere.

In carrying out my improved method, I dilute the blood plasma or serum or extract with from five to nine times its volume of distilled water. Under ordinary circumstances, at this dilution there will be present in the neighborhood of 13 to 16 milligrams of protein matter per milliliter of solution. This dilution of the plasma I have found to be quite necessary in order to permit the aluminum hydroxide to adsorb the hormonal substances. Of course, slight variations in either direction will give working conditions, but the most satisfactory results are obtained in the concentrations indicated. The diluted plasma or serum is then regulated by the addition of any suitable mineral acid, such as acetic or hydrochloric, to a pH of approximately 3.5. I have found that if the pH varies from approximately 2 to approximately 4.5, results can be obtained, but at either of these lower or upper limits, difficulty is encountered in carrying out the process. A pH of 3.5 has been found by me to give very satisfactory results, and I prefer to adjust the diluted plasma or serum to such a pH.

To the diluted and acidified serum or plasma or tissue extract, I add a suspension of aluminum hydroxide. This aluminum hydroxide may be of the type known as Willstätter Type A or Type B. I have found that unless the bound water content of the aluminum hydroxide ranges between 17% and 38%, even maintaining the other conditions as indicated herein, the adsorption of the hormone is not satisfactory. I prefer to use the aluminum hydroxide of the Willstätter Type A which contains 22% to 26% of bound water, although satisfactory results can be obtained with the Willstätter Type B aluminum hydroxide which contains 34% to 36% of bound water, provided this particular aluminum hydroxide is used very shortly after making. The method of determining the bound water content is that of R. Willstätter and H. Kraut, Berichte der Deutschen Chemischen Gesellschaft, vol. 57, pp. 1083–1084 (1924).

When the suspension of this aluminum hydroxide is added, the dilute serum or plasma or tissue extract is agitated and the aluminum hydroxide adsorbs the hormone. The aluminum hydroxide is then separated from the rest of the serum or plasma by any suitable method such as centrifugation or filtration. The hormonal substances are then separated from the aluminum hydroxide by a suitable elution process which need not be described in detail in this application, a satisfactory method being by elution with dilute ammonia or by adding disodium phosphate solution.

In order to prepare the material for parenteral administration it is of course desirable to sterilize the material and to dissolve it in the desired amount of water and to add buffer salts to make the final product substantially isotonic with tissue fluid. The particular methods of doing this have been described and set forth in my copending application for Method of preparing hormones, filed by me on this day Serial No. 18,916.

Having thus described my invention, what I claim as new and desire to secure by Letters Patent is:

1. The method of preparing for parenteral injection the gonadotropic hormonal substances occurring in the blood or uterine tissue of animals of the equine group during early pregnancy comprising diluting blood plasma or serum made from the blood of an animal of the equine group during early pregnancy with from 5 to 9 times its volume of water, adjusting the pH of the diluted plasma to from approximately 2 to approximately 4.5, separating the hormonal substances from the diluted plasma by adding thereto aluminum hydroxide having from 17% to 38% of bound water to adsorb the hormonal substances, separating the aluminum hydroxide with the adsorbed hormonal substances, and separating the hormonal substances from the aluminum hydroxide.

2. The method of preparing for parenteral injection the gonadotropic hormonal substances occurring in the blood or uterine tissue of animals of the equine group during early pregnancy, comprising diluting blood plasma or serum made from the blood of an animal of the equine group during early pregnancy with from 5 to 9 times its volume of water, adjusting the pH of the diluted plasma to approximately 3.5, separating the hormonal substances from the diluted plasma by adding thereto aluminum hydroxide having from 17% to 38% of bound water to adsorb the hormonal substances, separating the aluminum hydroxide with the adsorbed hormonal substances, and separating the hormonal substances from the aluminum hydroxide.

3. The method of preparing for parenteral injection the gonadotropic hormonal substances occurring in the blood or uterine tissue of animals of the equine group during early pregnancy, comprising diluting blood plasma or serum made from the blood of an animal of the equine group during early pregnancy with water, adjusting the pH of the diluting plasma to approximately 3.5, separating the hormonal substances from the diluted plasma by adding thereto aluminum hydroxide having from 17% to 38% of bound water to adsorb the hormonal substances, separating the aluminum hydroxide with the adsorbed hormonal substances, and separating the hormonal substances from the aluminum hydroxide.

4. The method of preparing for parenteral injection the gonadotropic hormonal substances occurring in the blood or uterine tissue of animals of the equine group during early pregnancy, comprising diluting blood plasma or serum made from the blood of an animal of the equine group during early pregnancy with from 5 to 9 times its volume of water, adjusting the pH of the diluted plasma to approximately 3.5, separating the hormonal substances from the diluted plasma by adding thereto aluminum hydroxide having from 22% to 26% of bound water to adsorb the hormonal substances, and separating the aluminum hydroxide with the adsorbed hormonal substances, and separating the hormonal substances from the aluminum hydroxide.

5. The method of preparing for parenteral injection the gonadotropic hormonal substances occurring in the blood or uterine tissue of animals of the equine group during early pregnancy, comprising diluting blood plasma or serum made from the blood of an animal of the equine group during early pregnancy with water, adjusting the pH of the diluted plasma to approximately 3.5, separating the hormonal substances from the diluted plasma by adding thereto aluminum hydroxide having from 22% to 26% of bound water to adsorb the hormonal substances, and separating the aluminum hydroxide with the adsorbed hormonal substances, and separating the hormonal substances from the aluminum hydroxide.

EDWIN L. GUSTUS.